United States Patent
Yeh

(10) Patent No.: US 8,424,790 B1
(45) Date of Patent: Apr. 23, 2013

(54) BRAKE DEVICE FOR A FISHING REEL

(76) Inventor: Shih-Yuan Yeh, Taichung (TW)

( * ) Notice: Subject to any disclaimer, the term of this patent is extended or adjusted under 35 U.S.C. 154(b) by 0 days.

(21) Appl. No.: 13/309,888

(22) Filed: Dec. 2, 2011

(51) Int. Cl.
*A01K 89/01* (2006.01)

(52) U.S. Cl.
USPC .................... 242/245; 242/244; 242/303

(58) Field of Classification Search .............. 242/244, 242/245, 246, 295, 302, 303, 304
See application file for complete search history.

(56) References Cited

U.S. PATENT DOCUMENTS

| | | | | | |
|---|---|---|---|---|---|
| 3,434,676 | A | * | 3/1969 | Bogue | 242/303 |
| 3,682,411 | A | * | 8/1972 | Dumbauld | 242/246 |
| 4,702,432 | A | * | 10/1987 | Kaneko et al. | 242/246 |
| 5,713,688 | A | * | 2/1998 | McCallum | 403/57 |
| 7,429,011 | B1 | * | 9/2008 | Chang | 242/260 |
| 8,066,216 | B2 | * | 11/2011 | Takechi | 242/246 |
| 2006/0016924 | A1 | * | 1/2006 | Hirayama et al. | 242/245 |
| 2006/0169814 | A1 | * | 8/2006 | Ikuta et al. | 242/295 |
| 2008/0093492 | A1 | * | 4/2008 | Tao | 242/246 |
| 2009/0033145 | A1 | * | 2/2009 | McIver et al. | 303/48 |

* cited by examiner

*Primary Examiner* — Emmanuel M Marcelo
(74) *Attorney, Agent, or Firm* — C. G. Mersereau; Nikolai & Mersereau, P.A.

(57) ABSTRACT

A brake device for a fishing reel has a first brake disk, a second brake disk and two abutting discs. The first brake disk has an outer side, a through hole and a friction face. The friction face is formed on the outer side of the first brake disk and is adapted to face a minor panel of a clutch of the fishing reel. The second brake disk parallels the first brake disk and has two sides, a through hole and two friction faces. The friction faces are respectively formed on the sides of the second brake disk and are adapted to face the minor panel and a major panel of the clutch. The abutting discs are mounted in the through hole of the second brake disk to respectively abut the panels of the clutch to enable the second brake disk to be mounted between the panels at intervals.

6 Claims, 5 Drawing Sheets

BRAKE DEVICE FOR A FISHING REEL

BACKGROUND OF THE INVENTION

1. Field of the Invention

The present invention relates to a brake device, and more particularly relates to a brake device for a fishing reel to provide a preferred operating effect to the fishing reel and to extend the life of the brake device.

2. Description of Related Art

Fishing is a very popular recreation; a conventional fishing reel is a necessary tool for fishing and has body, a spool, a handle and a clutch. The body is a cylindrical frame. The spool is rotatably mounted in the body to wind a fishing line on the spool. The handle is rotatably mounted on an end of the body and selectively connects to and rotates the spool. The clutch is mounted in the body between the spool and the handle and selectively connects the spool and the handle by a switch of the clutch.

Furthermore, the conventional fishing reel has a brake disk mounted on a side face of the spool to selectively abut against the clutch to provide a deceleration effect to the conventional fishing reel. However, the deceleration force that is formed by the friction between the brake disk and the clutch is not enough to provide a preferred braking effect to the conventional fishing reel. In addition, the brake disk may wear down after a long time in use such that the life of the brake disk is shortened and this will influence the operating effect to the conventional fishing reel.

Therefore, the present invention provides a brake device for a fishing reel to mitigate or obviate the aforementioned problems.

SUMMARY OF THE INVENTION

The main objective of the present invention is to provide a brake device for a fishing reel that can provide a preferred operating effect to the fishing reel and can extend the life of the brake device.

The brake device for a fishing reel in accordance with the present invention has a first brake disk, a second brake disk and two abutting discs. The first brake disk has an outer side, a through hole and a friction face. The outer side of the first brake disk is adapted to face a minor panel of a clutch of the fishing reel. The friction face is formed on the outer side of the first brake disk. The second brake disk parallels the first brake disk and has an inner side, an outer side, a through hole and two friction faces. The friction faces are respectively formed on the sides of the second brake disk and are adapted to face the minor panel and a major panel of the clutch. The abutting discs are mounted in the through hole of the second brake disk to respectively abut the panels of the clutch to enable the second brake disk to be mounted between the panels of the clutch at intervals.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
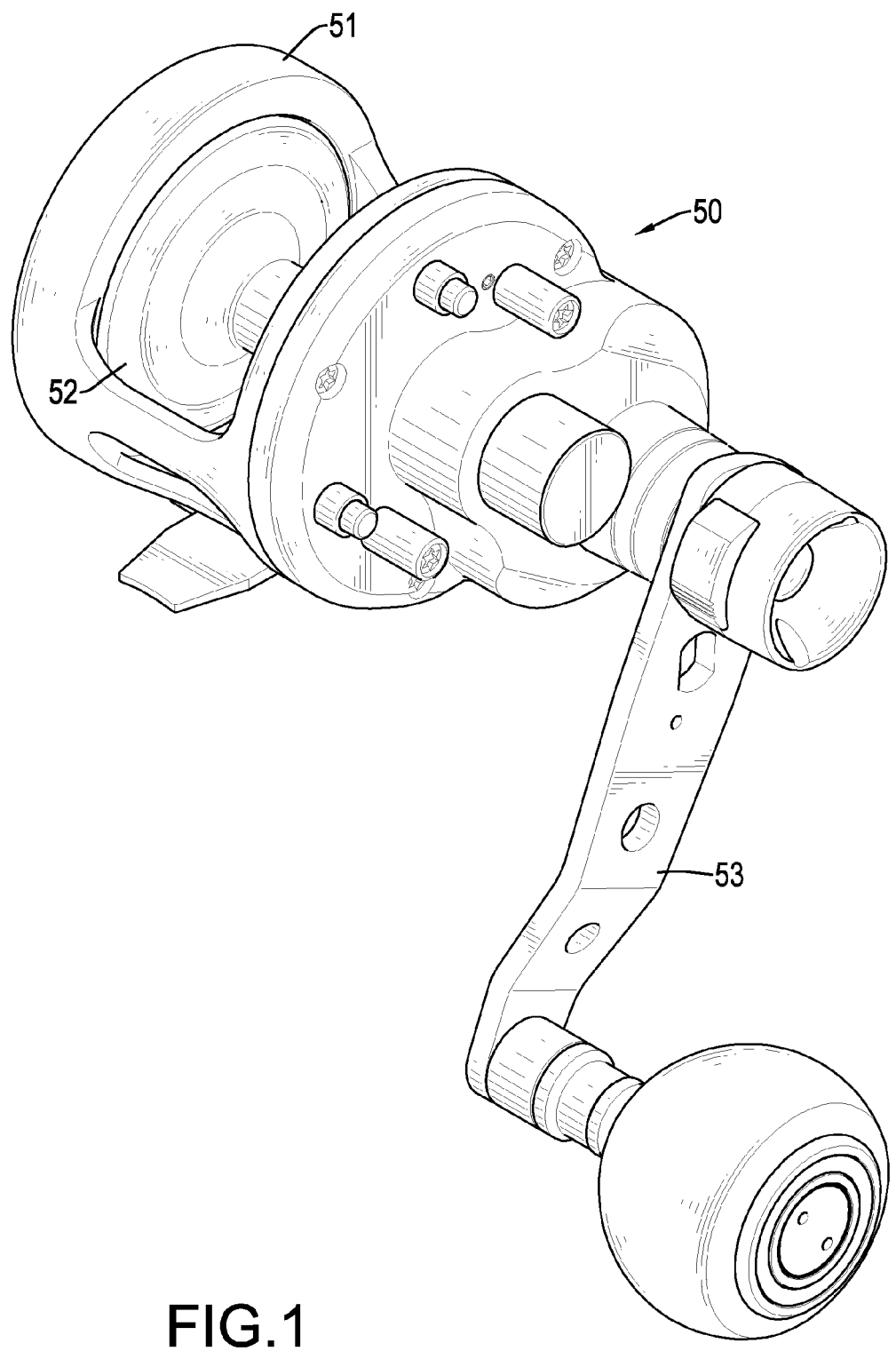
FIG. 1 is a perspective view of a fishing reel with a brake device in accordance with the present invention.
Figure 2:
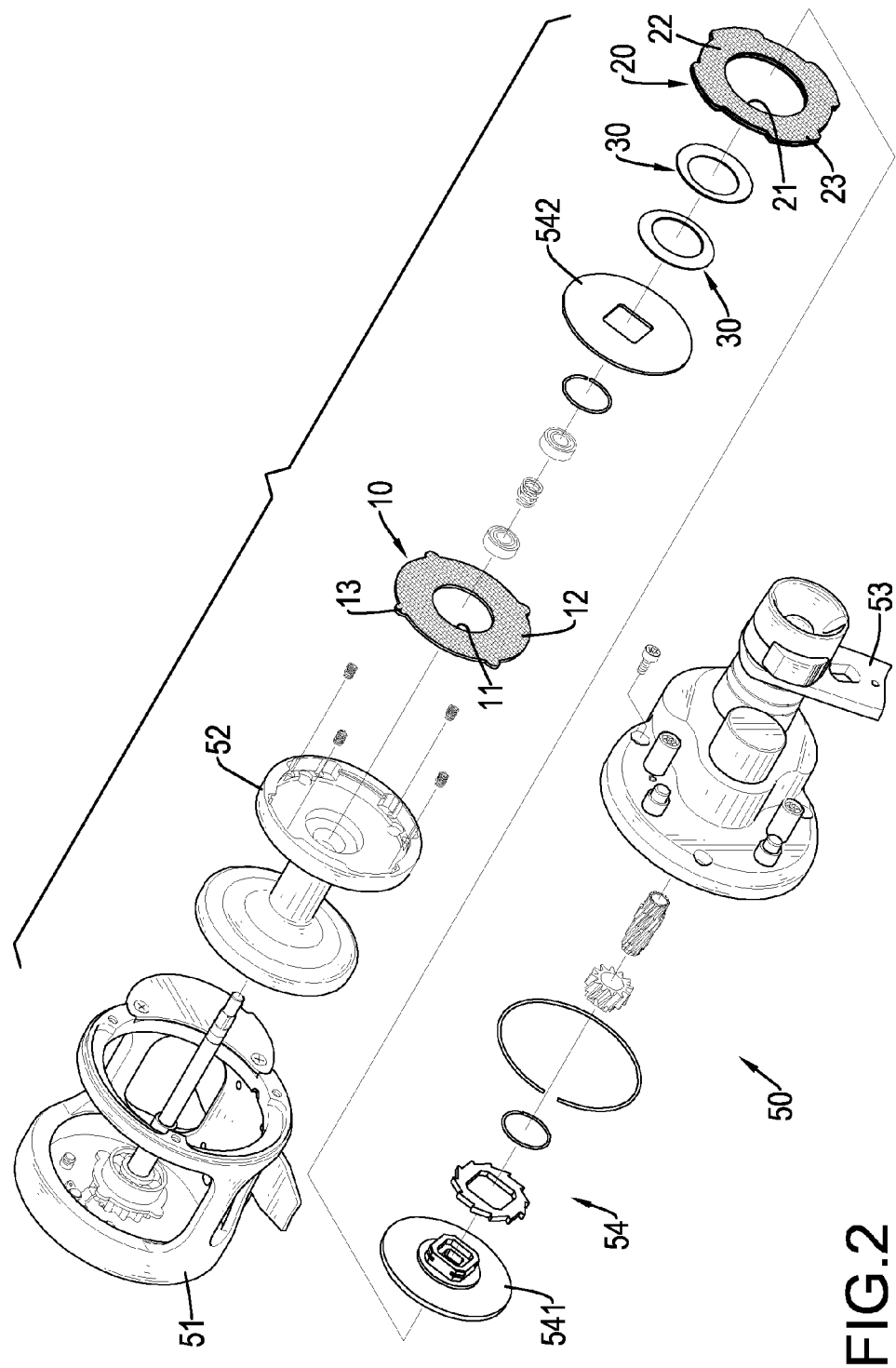
FIG. 2 is an exploded perspective view of the fishing reel with the brake device in FIG. 1.
Figure 3:
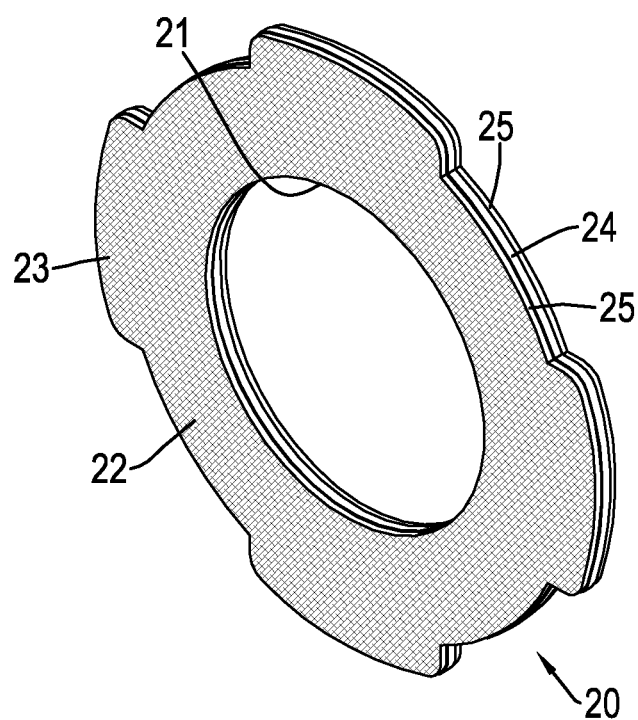
FIG. 3 is an enlarged perspective view of a second brake disk of the brake device in FIG. 2.
Figure 4:
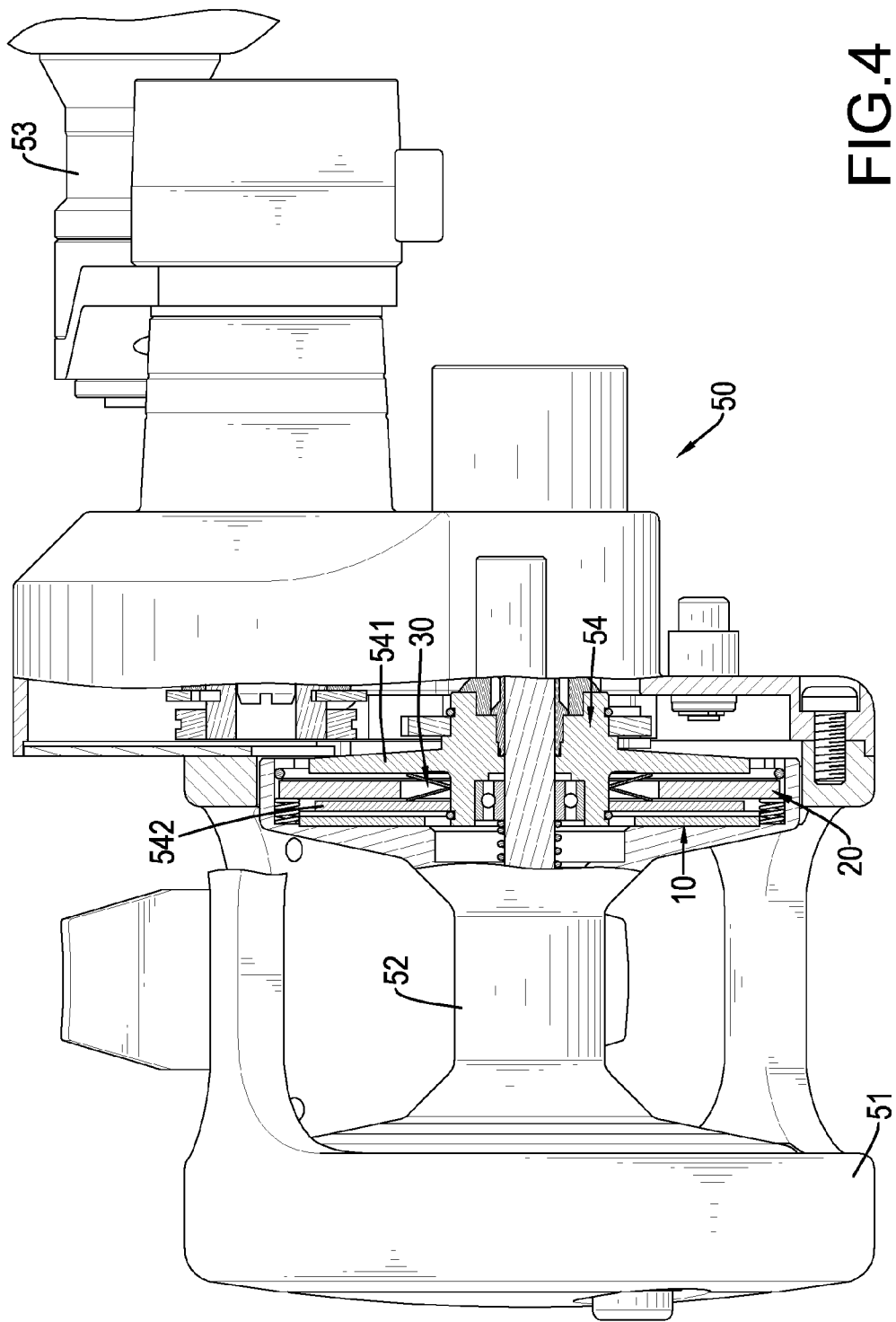
FIG. 4 is a side view in partial section of fishing reel with the brake device in FIG. 1.

With reference to FIGS. 1 to 5, a brake device in accordance with the present invention is mounted in a fishing reel 50 that has a body 51, a spool 52, a handle 53 and a clutch 54. The brake device in accordance with the present invention is mounted in the body 51 of the fishing reel 50 between the spool 52 and the clutch 54 and comprises a first brake disk 10, a second brake disk 20 and two abutting discs 30.

The body 51 is a cylindrical frame. The spool 52 is rotatably mounted in the body 51 to wind a fishing line on the spool 52. The handle 53 is rotatably mounted on an end of the body 51 and selectively connects to and rotates the spool 52. The clutch 54 is mounted in the body 51 between the spool 52 and the handle 53, selectively connects the spool 52 with the handle 53 and has a major panel 541 and a minor panel 542. The structure and the operation of the fishing reel 50 may be conventional and are not described in detail in the present invention.

The first brake disk 10 is annular, is mounted in the spool 52 and parallels the minor panel 542 of the clutch 54 at an interval and has a center, an outer side, a periphery, a through hole 11, a friction face 12 and multiple positioning protrusions 13. The outer side of the first brake disk 10 faces the minor panel 542 of the clutch 54. The through hole 11 is formed through the center of the first brake disk 10. The friction face 12 is formed on the outer side of the first brake disk 10 and selectively abuts the minor panel 542 of the clutch 54. The positioning protrusions 13 are formed on and protrude from the periphery of the first brake disk 10 at intervals.

The second brake disk 20 is annular, is mounted in the spool 52 between the major panel 541 and the minor panel 542 of the clutch 54 and parallels the first brake disk 10 and has a center, an inner side, an outer side, a periphery, a through hole 21, two friction faces 22 and multiple positioning protrusions 23. The inner side of the second brake disk 20 faces the minor panel 542 of the clutch 54. The outer side of the second brake disk 20 faces the major panel 541 of the clutch 54. The through hole 21 is formed through the center of the second brake disk 20. The friction faces 22 are respectively formed on the sides of the second brake disk 20 and selectively abut the panels 541, 542 of the clutch 54. The positioning protrusions 23 are formed on and protrude from the periphery of the second brake disk 20 at intervals. Preferably, the second brake disk 20 is formed of a major disk 24 with two sides and two friction panels 25 respectively mounted on the sides of the major disk 24 to be the friction faces 22 of the second brake disk 20.

The abutting discs 30 are annular and conical elastic discs, are mounted in the spool 52 between the panels 541, 542 of the clutch 54 and are mounted in the through hole 21 of the second brake disk 20, and each abutting disc 30 has an inner side and an outer side. The inner sides of the abutting discs 30 abut each other in the through hole 21 of the second brake disk 20. The outer sides of the abutting discs 30 extend out of the through hole 21 of the second brake disk 20 and respectively abut the panels 541, 542 of the clutch 54 to enable the second brake disk 20 to be mounted between the panels 541, 542 of the clutch 54 at intervals.

Figure 5:
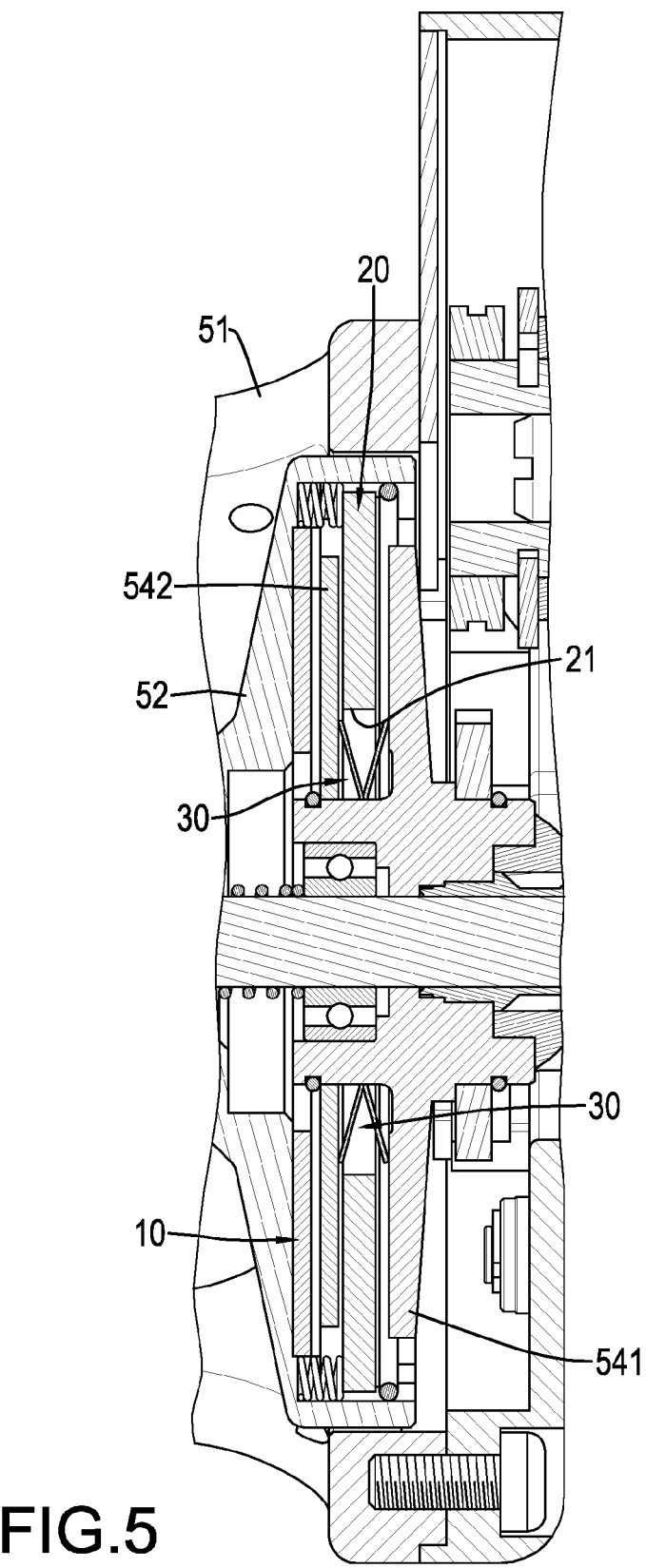
FIG. 5 is an enlarged side view in partial section of the brake device in FIG. 4.

With reference to FIG. 5, in assembly, the brake disks 10, 20 and the abutting discs 30 of the brake device in accordance with the present invention are mounted in the fishing reel 50 between the spool 52 and the panels 541, 542 of the clutch 54 to enable the outer sides of the abutting discs 30 to respectively abut the panels 541, 542 of the clutch 54 and to enable the second brake disk 20 to be mounted between the panels 541, 542 of the clutch 54 at intervals. Therefore, the brake device in accordance with the present invention can be assembled in the fishing reel conveniently.

When a user wants to decelerate the fishing reel 50, the clutch 54 will move toward the spool 52 (the movement of the clutch 54 may be a prior art; the description of the movement is omitted) and the panels 541, 542 will press the abutting discs 30 to move close to the brake disks 10, 20. Then, the panels 541, 542 of the clutch 54 will press against the three friction faces 12, 22 of the brake disks 10, 20 to provide a deceleration effect to the fishing reel 50.

According to the above-mentioned statements, in use, the brake device in accordance with the present invention for the fishing reel 50 have three friction faces 12, 22 to abut against the panels 541, 542 of the clutch 54 at the same time, and the friction forces between the brake disks 10, 20 and the clutch 54 are enough to provide a preferred braking effect to the fishing reel 50. In addition, the clutch 54 can be stopped by the brake disks 10, 20 at the same time and the life of the friction faces 12, 22 can be longer than the life of the brake disk of the conventional fishing reel.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A brake device for a fishing reel 50 having a body 51, a spool 52 mounted in the body 50, a handle 53 rotatably mounted on an end of the body 51 and selectively connecting to and rotating the spool 52, and a clutch 54 mounted in the body 51 between the spool 52 and the handle 53, selectively connecting the spool 52 and the handle 53 and having a major panel 541 and a minor panel 542, and the brake device comprising:

a first brake disk 10 adapted to be mounted in the spool 52 and paralleling the minor panel 542 of the clutch 54 at an interval and having
      a center;
      an outer side adapted to face the minor panel 542 of the clutch 54;
      a through hole 11 formed through the center of the first brake disk 10; and
      a friction face 12 formed on the outer side of the first brake disk 10 to selectively abut the minor panel 542 of the clutch 54;

a second brake disk 20 paralleling the first brake disk 10, adapted to be mounted in the spool 52 between the major panel 541 and the minor panel 542 of the clutch 54 and having
      a center;
      an inner side adapted to face the minor panel 542 of the clutch 54;
      an outer side adapted to face the major panel 541 of the clutch 54;
      a through hole 21 formed through the center of the second brake disk 20; and
      two friction faces 22 respectively formed on the sides of the second brake disk 20 to selectively abut the panels 541, 542 of the clutch 54; and two abutting discs 30 mounted in the through hole 21 of the second brake disk 20, adapted to be mounted in the spool 52 between the panels 541, 542 of the clutch 54 and each abutting disc 30 having
      an inner side, the inner sides of the abutting discs 30 abutting each other in the through hole 21 of the second brake disk 20; and
      an outer side, the outer sides of the abutting discs 30 extending out of the through hole 21 of the second brake disk 20 to respectively abut the panels 541, 542 of the clutch 54 to enable the second brake disk 20 to be mounted between the panels 541, 542 of the clutch 54 at intervals.

2. The brake device for a fishing reel as claimed in claim 1, wherein
   the first brake disk 10 has
      a periphery; and
      multiple positioning protrusions 13 formed on and protruding from the periphery of the first brake disk 10 at intervals; and
   the second brake disk 20 has
      a periphery; and
      multiple positioning protrusions 23 formed on and protruding from the periphery of the second brake disk 20 at intervals.

3. The brake device for a fishing reel as claimed in claim 2, wherein the second brake disk 20 is formed of a major disk 24 with two sides and two friction panels 25 respectively mounted on the sides of the major disk 24 to be the friction faces 22 of the second brake disk 20.

4. The brake device for a fishing reel as claimed in claim 3, wherein each abutting disc 30 is an annular and conical elastic disc.

5. The brake device for a fishing reel as claimed in claim 1, wherein each abutting disc 30 is an annular and conical elastic disc.

6. The brake device for a fishing reel as claimed in claim 1, wherein the second brake disk 20 is formed of a major disk 24 with two sides and two friction panels 25 respectively mounted on the sides of the major disk 24 to be the friction faces 22 of the second brake disk 20.

* * * * *